United States Patent [19]
Olkkola

[11] Patent Number: 6,079,682
[45] Date of Patent: Jun. 27, 2000

[54] APPARATUS FOR MOUNTING A MOBILE DEVICE ON A SUPPORT SURFACE

[75] Inventor: Jari Olkkola, Irving, Tex.

[73] Assignee: Nokia Mobile Phones Limited, Espoo, Finland

[21] Appl. No.: 09/219,760

[22] Filed: Dec. 23, 1998

[51] Int. Cl.⁷ .................................................. E04G 3/00
[52] U.S. Cl. ................................ 248/278.1; 248/292.12; 403/97
[58] Field of Search ............................ 248/276.1, 278.1, 248/292.12, 177.1, 178.1, 179.1, 183.1, 187.1, 514, 515; 403/97, 375, 91; 379/454, 455; 224/926, 553, 551

[56] References Cited

U.S. PATENT DOCUMENTS

| | | | |
|---|---|---|---|
| 2,360,248 | 10/1944 | Mace | 248/292.12 |
| 2,622,831 | 12/1952 | Fullwood | 248/292.12 |
| 2,896,901 | 7/1959 | Levy et al. | 248/278.1 |
| 3,784,149 | 1/1974 | Brudy | 248/478 |
| 3,889,908 | 6/1975 | Larson | 248/515 X |
| 4,108,412 | 8/1978 | Miller et al. | 248/187.1 |
| 4,560,831 | 12/1985 | Bast et al. | 248/288.3 |
| 4,617,430 | 10/1986 | Bryant | 248/288.3 |

*Primary Examiner*—Ramon O. Ramirez
*Assistant Examiner*—Gwendolyn Baxter
*Attorney, Agent, or Firm*—Brian T. Rivers

[57] ABSTRACT

A mounting apparatus includes a base and receptacle for receiving the base in a support surface. A mounting assembly for mounting a mobile device may be secured to the base. The mounting apparatus may be secured to a support surface with a securing member, such as a thumbscrew, using one hand. In an embodiment, the mounting apparatus includes a cylindrical base including a mounting hole and a bottom surface having a securing pin. The mounting apparatus also includes a mounting assembly and a receptacle that has a bottom surface and inner surface forming a cylindrical receiving portion having a mounting hole. When the base is inserted into the receiving portion of the receptacle and rotated, the securing pin is received in the securing hole and the bottom surface of the base contacts the bottom surface of the receptacle. A securing member may be inserted through the mounting hole of the mounting assembly and mounting hole of the base into the mounting hole of the receiving portion to allow the base to be rotated during insertion and to secure the mounting apparatus to the support surface.

14 Claims, 4 Drawing Sheets

6,079,682

APPARATUS FOR MOUNTING A MOBILE DEVICE ON A SUPPORT SURFACE

FIELD OF THE INVENTION

The present invention relates generally to mounting apparatuses for mobile devices and, more particularly, to a mounting apparatus for mounting a mobile device on a support surface, such as, for example, a surface within a vehicular compartment.

BACKGROUND OF THE INVENTION

Advancements in communications technologies have permitted the implementation of new types of communications devices. The new types of communications devices may be portable and may be carried by hand or used in a vehicle. When used in a vehicle, it may be desired that the device be mounted in a location that is easily accessible by the user of the portable device, either for hands-free operation or for easy grasping and access for normal operation. Since the user of a portable device may own more than one vehicle, it may be desirable that the user be able to mount a particular portable device in each of the user's vehicles quickly and easily and be able to remove the mounted portable device quickly and easily from each vehicle. At the same time, it may also be desirable that the user of the particular portable device be able to do the same for another portable device that differs from that particular portable device in size and shape.

Because even portable devices of the same manufacturer differ drastically in size and shape, it may be difficult to create a mounting system for all portable devices for installation in each vehicle that could be used by a user who owns or uses many different devices. Each portable device could conceivably require a completely different mounting system from that required by another portable device. The situation is complicated by the fact that the interior compartments of vehicles differ in the available types of surfaces on which a mounting system could be mounted within the vehicle. The situation is also complicated by the fact that many mounting systems require permanent installation.

SUMMARY OF THE INVENTION

The present invention provides an apparatus for mounting a mobile device on a support surface. The mounting apparatus includes a base that may easily and conveniently be mounted on the support surface. When secured to the support surface, the base provides a mounting surface for a device-mounting assembly. The mounting apparatus may be configured so that the base and device-mounting assembly may be secured to the support surface with a securing member, such as a thumbscrew, using one hand.

In an embodiment of the invention, the mounting apparatus includes a base and a receptacle having a bottom surface and an interior surface that form a receiving portion. The base may be cylindrical and include a top surface and a bottom surface having a securing pin extending outward perpendicularly from the bottom surface of the base. The base has a mounting hole extending through the top and bottom surfaces of the base. The receptacle includes a mounting hole and a securing hole formed in the bottom surface of the receptacle. When the base is inserted into the receiving portion of the receptacle and rotated, the securing pin is received in the securing hole and the bottom surface of the base contacts the bottom surface of the receiving portion. The base then fits snugly in the receptacle. A securing member may be inserted through the mounting hole of the base into the mounting hole of the receiving portion of the receptacle to allow the base to be rotated during insertion into the receiving portion and to secure the base in the receptacle. A mounting assembly for a device may be secured to the top surface of the base using the securing member. The securing member may be a thumbscrew including an externally threaded portion for securing the securing member in an internally threaded portion of the mounting hole of the receptacle.

BRIEF DESCRIPTION OF THE DRAWINGS

The above set forth and other features of the invention are made more apparent in the ensuing Detailed Description of the Invention when read in conjunction with the accompanying drawings wherein:

FIG. 1b illustrates an exploded view of the mounting structure of FIG. 1a;

FIG. 1c illustrates a bottom perspective view of the base of the mounting structure of FIG. 1a;

FIG. 3 illustrates a complete device-mounting assembly, including the mounting structure of FIG. 1a;

DETAILED DESCRIPTION OF THE INVENTION

Figure 1A:
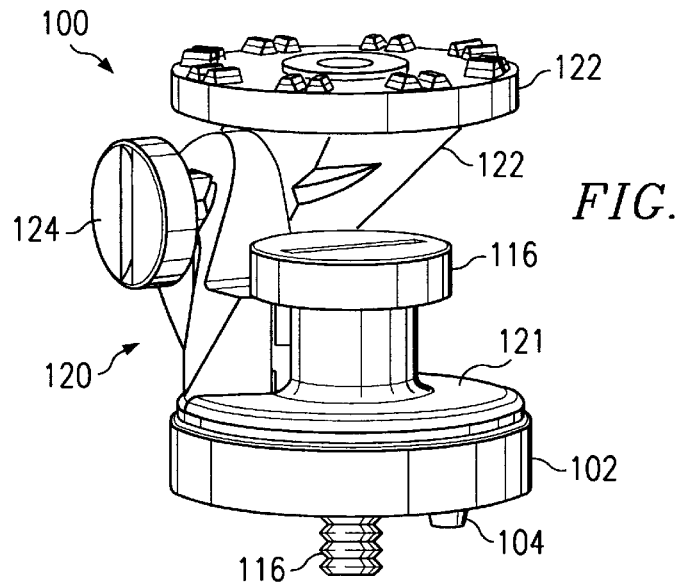
FIG. 1a illustrates a portion of an apparatus for mounting a device on a support surface according to an embodiment.

Referring now to FIG. 1a, therein is illustrated a portion of an apparatus for mounting a device on a support surface according to an embodiment of the invention. Mounting structure 100 comprises base 102, securing member 116 and mounting assembly 120. Base 102 includes securing pin 104. Mounting assembly 120 includes mounting plate 121, pivot member 124 and mounting plate 122. Securing member 116 serves to secure mounting assembly 120 to base 102 and to a support surface. A device, such as a mobile telephone or a device holder, may be mounted on mounting plate 122 of mounting assembly 120.

Figure 1C:
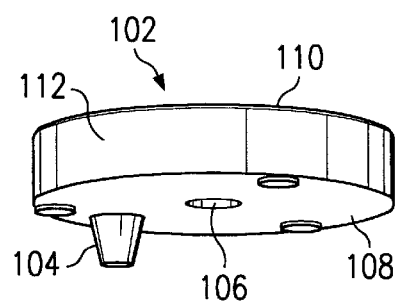
Figure 1B:
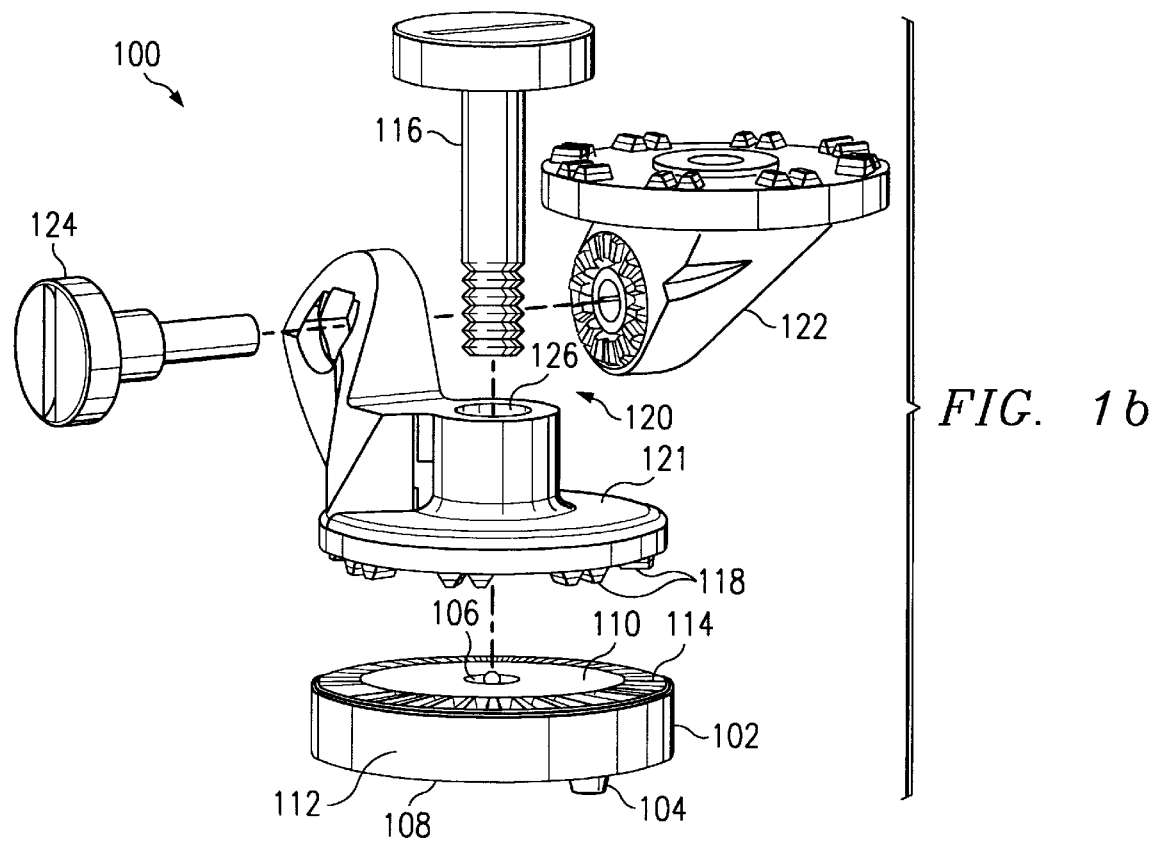

FIG. 1b illustrates an exploded view of the mounting structure 100 shown in FIG. 1a. Mounting plate 122 is secured on mounting plate 121 by pivot member 124 to form mounting assembly 120. Pivot member 124 may include an externally threaded portion that engages an internally threaded portion of mounting plate 122 to secure mounting plate 122 to mounting plate 121. FIG. 1b shows top surface 110, outer cylindrical surface 112 and bottom surface 108 of base 102. Top surface 110 includes a serrated portion 114 into which teeth 118 extending downward from mounting plate 121 engage. A mounting hole 106 extends through base 102 from top surface 110 to bottom surface 108. Mounting assembly 120 is placed on top surface 110 of base 102 and securing member 116 is inserted through mounting hole 126 of mounting plate 121, through mounting hole 106 of base 102 to hold mounting assembly 120 on base 102.

FIG. 1c illustrates a bottom perspective view of base 102 of the mounting apparatus of FIG. 1a. Base 102 is rotated 180 degrees with respect to securing pin 104, when compared with FIGS. 1a and 1b. FIG. 1c shows mounting hole 106 extending through bottom surface 108 and securing pin 104 extending outward from bottom surface 108.

Figure 2A:
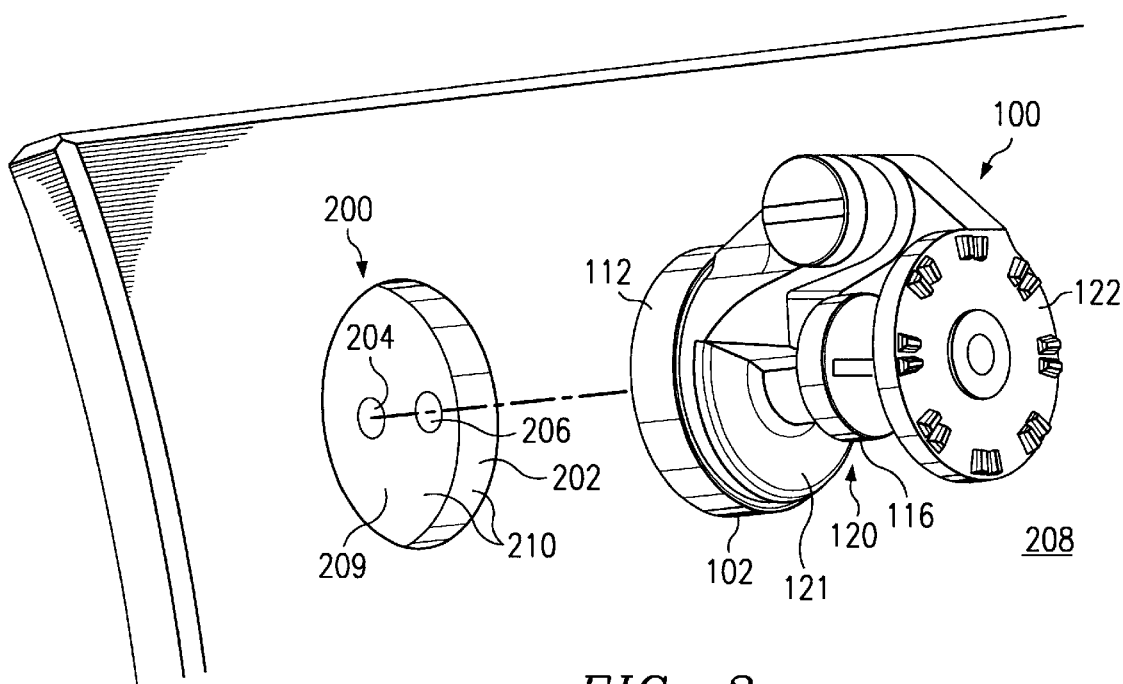
FIG. 2a illustrates an apparatus for mounting a device on a support surface according to an embodiment of the invention.
Figure 2B:
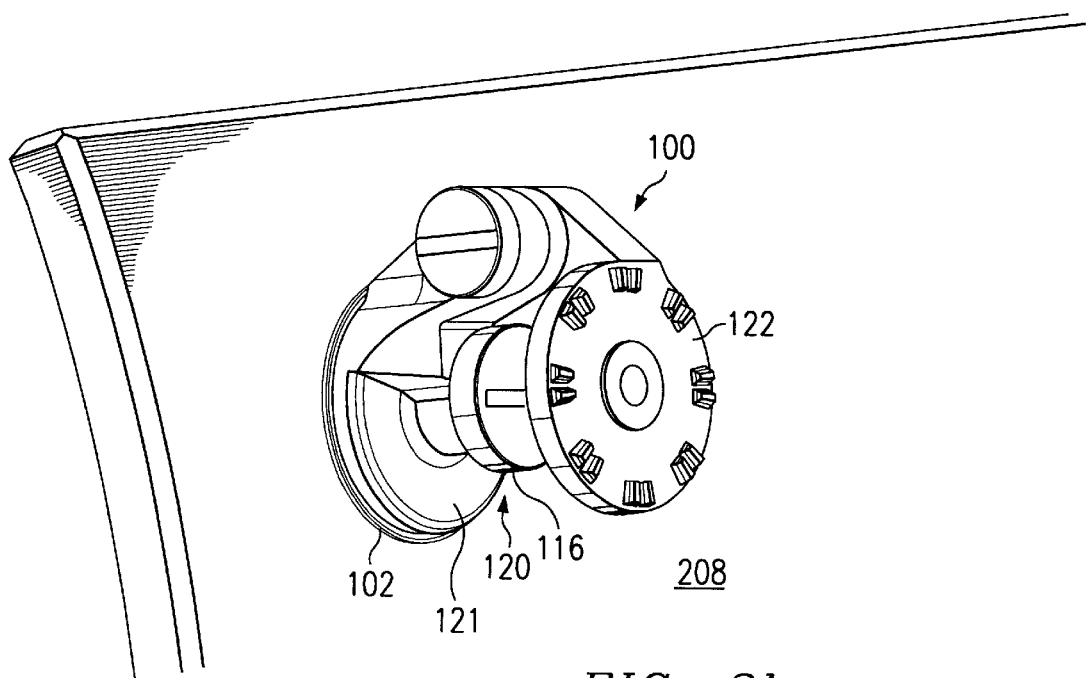
FIG. 2b illustrates the apparatus for mounting a device of FIG. 2a in a secured position.

Referring now to FIG. 2a, therein is illustrated an apparatus for mounting a device on a support surface according to an embodiment of the invention. The apparatus includes mounting structure 100 and receptacle 200 having an inner surface 202 and a bottom surface 209 that form a receiving portion 210 for receiving base 102 in support surface 208. Receiving portion 210 may be sized to allow base 102 to fit snugly within inner surface 202. Bottom surface 209 includes mounting hole 204 and securing hole 206. In the embodiment of the invention, mounting hole 204 is centered so the securing member 116 guides base 102 into receiving portion 210. Base 102 may then be rotated as outer cylindrical surface 112 of base 102 engages inner surface 202, so that securing pin 104 engages securing hole 206, allowing bottom surface 108 of base 102 to contact bottom surface 209 of receiving portion 210. Base 102 is then held snugly in receiving portion 210. Mounting hole 204 may include an internally threaded portion to receive an externally threaded portion on securing member 116, allowing base 102, mounting assembly 120 and securing member 116 to be secured onto support surface 208 by turning securing member 116. Securing member 116 may be configured as a thumbscrew to allow easy securing of base 102 in receiving portion 210. FIG. 2b illustrates apparatus for mounting a device of FIG. 2a in a secured position.

Figure 3:
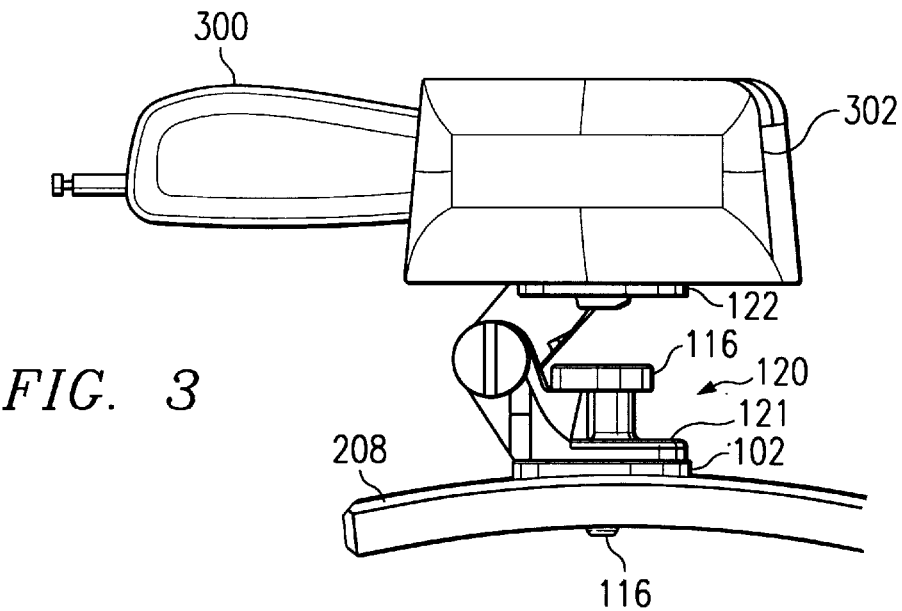

When mounted on support surface 208, mounting structure 100 may be used to mount a device by securing the device or a device holder to mounting plate 122 of mounting assembly 120. FIG. 3 illustrates a device holder 302 secured to mounting plate 122 for mounting mobile phone 300.

Base 102 may also be used as a universal mounting base for device-mounting assemblies that include a mounting plate compatible with top surface 110 on any surface that includes a receptacle such as receptacle 200. In this case, mounting assembly 120, including pivot member 124, mounting plate 122 and mounting plate 121 of FIGS. 1a and 1b would be replaced with a mounting assembly of a different type.

Figure 4:
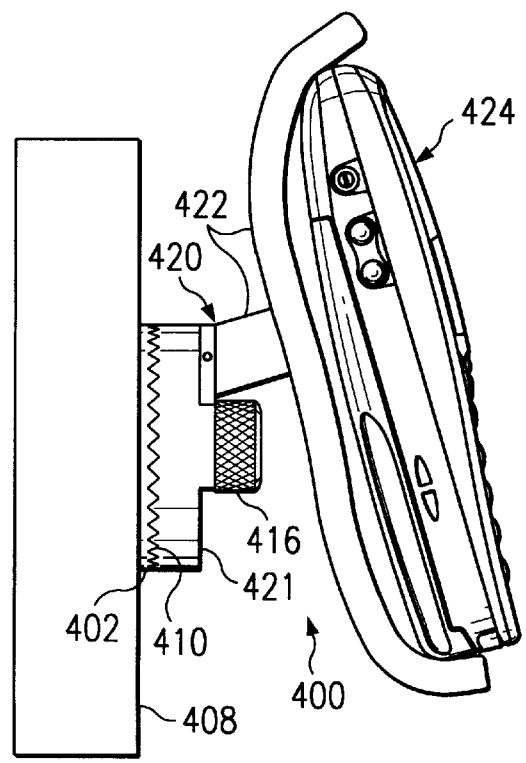
FIG. 4 illustrates an alternative embodiment of a mounting apparatus for mounting a device on a support surface.

Referring now to FIG. 4, therein is illustrated an alternative embodiment of a mounting apparatus 400 for mounting a device on a support surface 408. In the embodiment of FIG. 4, mounting apparatus 400 includes base 402, securing member 416, mounting assembly 420, and a receptacle (not visible) in support surface 408. Mounting assembly 420 includes mounting plate 421 and mounting bracket 422. Base 402 may be constructed similarly to base 102 of FIGS. 1a–1c. Mounting assembly 420 serves the same function as mounting assembly 120 of FIG. 1a, i.e., mounting assembly 420 is used to secure a device, such as mobile telephone 424 or a device holder, to base 402. Mounting plate 421 may be configured to engage top surface 410 on base 402. Securing member 416 is inserted through mounting holes in mounting assembly 420 and base 402 to secure base 402 in a receiving portion of the receptacle in surface 408. The receiving portion in surface 408 may be configured similarly to receiving portion 210 of FIG. 2a.

In alternative configurations of the embodiments of FIG. 1a–1c through FIG. 4, the base and receptacle may be constructed without the securing pin or securing hole. In this alternative configuration the base is secured in the receiving portion by the securing member, and the base may rotate in the receiving portion until tightly secured. Alternatively, the shape of the base and receptacle may be a shape other than cylindrical in these alternative configurations so that the base is constrained from rotating around the securing member when inserted in the receiving portion.

Figure 5A:
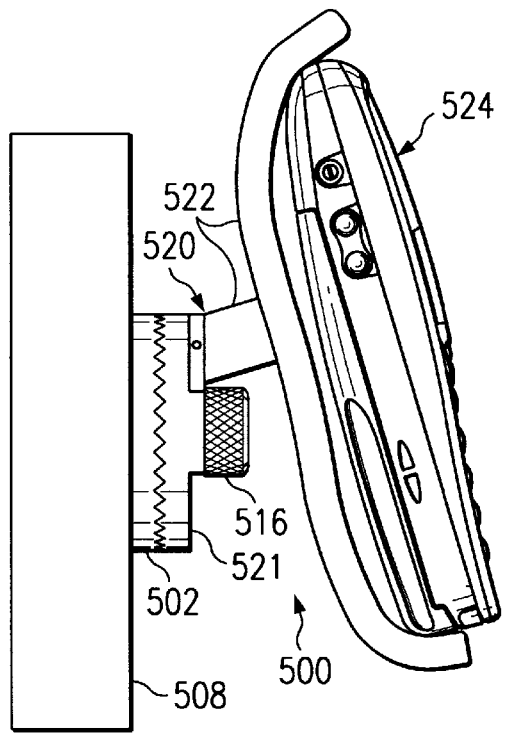
FIG. 5a illustrates another alternative embodiment of a mounting apparatus for mounting a device on a support surface.

FIG. 5a illustrates another alternative embodiment of a mounting apparatus 500. FIG. 5A illustrates a surface-mounting embodiment of the invention where base 502 sits directly on the surface of support surface 508, not within a receiving portion such as receiving portion 210 of FIG. 2a. In the alternative embodiment of FIG. 5a, mounting apparatus 500 is similar to mounting apparatus 400 of FIG. 4, and parts 502–524 correspond to parts 402–424 of FIG. 4.

Figure 5B:
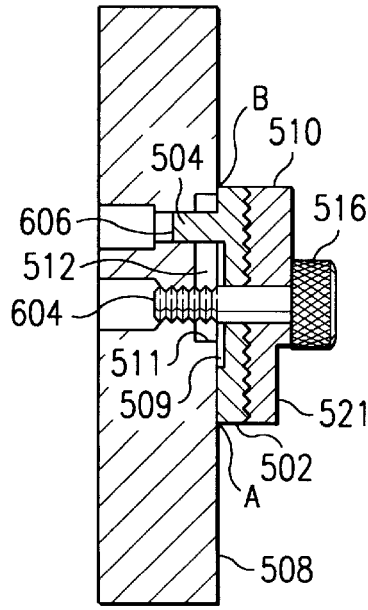
FIG. 5b illustrates a front view of the alternative embodiment of the mounting apparatus of FIG. 5a with the mobile telephone and holder removed from view.
Figure 5C:
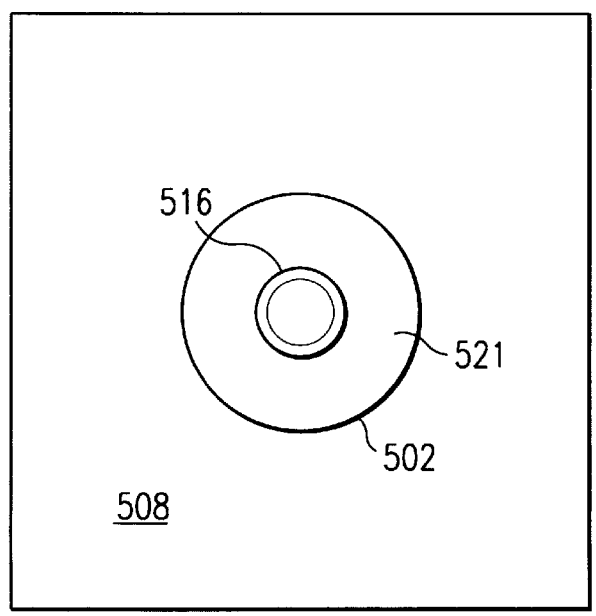
FIG. 5c illustrates a cross-sectional view taken along line aa—aa of FIG. 5b.

FIG. 5c illustrates a cross-sectional view taken along line aa—aa of FIG. 5b, which illustrates a front view of the mounting apparatus 500 of FIG. 5a with mobile telephone 524 and holder 522 removed from view. Base 502 is secured to support surface 508 in a similar manner as base 102 is secured to support surface 208 in FIG. 2a, except that receiving portion 510 for base 502 is sized so that base 502 does not fit within receiving portion 510, but bottom surface 509 of base 502 rests directly on support surface 508, as shown at points A and B. Securing hole 606 and mounting hole 604 in support surface 508 receive securing pin 504 and securing member 516, respectively. The indented receiving portion 510 aids in guiding securing pin 504 and securing member 516 into securing hole 606 and mounting hole 604. Mounting hole 604 may include an internally threaded portion to receive an externally threaded portion of securing member 516 and secure mounting plate 521 to base 502, and base 502 to support surface 508. Receiving portion 510 of the embodiment shown in FIGS. 5a–5c may be circular and may have an interior surface 511 and bottom surface 512, when viewed from a point perpendicular to surface 508. Receiving portion 510 may also be any other suitable shape that allows securing pin 504 and securing member 516 to be easily guided into securing hole 606 and mounting hole 604. Alternatively, mounting hole 604 and securing hole 606 may be formed directly in surface 508 to receive securing member 516 and securing pin 504, respectively, without indented receiving portion 510 being formed in support surface 508, so that the portion of support surface 508 under base 502 serves as a mounting surface for base 502. Also, base 502 of the embodiment shown in FIGS. 5a–5c and its alternatives may be a shape other than cylindrical and may be used as a universal mounting base for mounting assemblies other than mounting assembly 520.

Although described in the context of particular embodiments, it will be realized that a number of modifications to these teachings may occur to one skilled in the art. Thus, while the invention has been particularly shown and described with respect to specific embodiments thereof, it will be understood by those skilled in the art that changes in form and shape may be made therein without departing from the scope and spirit of the invention.

What is claimed is:

1. An apparatus for mounting a device, said apparatus comprising:

an assembly for mounting the device, said assembly having a mounting hole;

a securing member;

a receptacle, said receptacle having a bottom surface and an inner surface forming a cylindrical receiving portion, said receptacle further having a mounting hole and at least one securing hole formed in said bottom surface of said receptacle; and a base comprising a top surface, a bottom surface and a mounting hole extending through said top and bottom surfaces of said base, said base cylindrical in form and further comprising at least one securing pin extending outward from said bottom surface of said base, wherein said securing member is inserted through said mounting hole of said assembly, through said mounting hole of said base, and into said mounting hole in said bottom surface of said receptacle to secure said assembly to said top surface of said base and said base in said cylindrical receiving portion of said receptacle, wherein said mounting hole of said base and said securing member are formed to allow said base to be rotated around said securing member for positioning prior to securing said base in said cylindrical receiving portion of said receptacle, and wherein said at least one securing pin couples into said at least one securing hole when said base is inserted into said cylindrical receiving portion of said receptacle to prevent rotational movement of said base within said receptacle.

2. An apparatus for mounting a device, said apparatus comprising:

a receptacle, said receptacle having a bottom surface and an inner surface forming a cylindrical receiving portion, said receptacle further having a mounting hole and at least one securing hole formed in said bottom surface of said receptacle;

a cylindrical base comprising a top surface, a bottom surface and an outer circular surface, said cylindrical base having at least one securing pin extending from said bottom surface, wherein said bottom surface of said receptacle contacts said bottom surface of said base, and said at least one securing pin couples into said at least one securing hole of said receptacle when said cylindrical base is inserted into said cylindrical receiving portion of said receptacle, said at least one securing pin preventing rotational movement of said cylindrical base within said cylindrical receiving portion of said receptacle;

an assembly for mounting the device, said assembly comprising a mounting hole; and a securing member, wherein said securing member is inserted through said mounting hole of said assembly, said mounting hole of said cylindrical base and into said mounting hole of said receptacle to secure said assembly to said top surface of said cylindrical base and to secure said cylindrical base in said cylindrical receiving portion of said receptacle.

3. The apparatus of claim 2, wherein said mounting hole of said receptacle is centered in said bottom surface of said receptacle, and said mounting hole of said cylindrical base is centered in said bottom surface of said cylindrical base, and wherein said cylindrical base is formed to allow insertion of said base into said cylindrical receiving portion of said receptacle and rotation of said cylindrical base around said securing member until said at least one securing pin engages said at least one securing hole and said bottom surface of said cylindrical base contacts said bottom surface of said receptacle.

4. The apparatus of claim 2, wherein said top surface of said base includes a serrated portion and said assembly further comprises a bottom surface, and wherein said bottom surface of said assembly includes a plurality of teeth extending outward from said bottom surface of said assembly, said teeth for mating with said serrated portion when said assembly is secured to said top surface of said cylindrical base.

5. The apparatus of claim 2, wherein said securing member comprises a first end having an externally threaded portion and said mounting hole of said receptacle is formed of an internally threaded portion formed in said bottom surface of said receptacle, and wherein said externally threaded portion is secured into said internally threaded portion to secure said cylindrical base in said cylindrical receiving portion of said receptacle.

6. The apparatus of claim 5, wherein said securing member further comprises a second end having a thumbscrew portion.

7. An apparatus for securing a device-mounting assembly having a mounting hole on a support surface having a receptacle including a bottom surface and an inner surface forming a cylindrical receiving portion, said bottom surface of said receptacle including a mounting hole centered in said bottom surface of said receptacle and at least one securing hole, said apparatus comprising:

a base, said base cylindrical in shape and having a top surface, a bottom surface and a mounting hole extending through said top and bottom surfaces of said base, said mounting hole of said base centered in said bottom surface of said base, said base further having at least one securing pin extending substantially perpendicular from said bottom surface of said base; and a securing member, wherein said securing member is inserted through the mounting hole of the device-mounting assembly, said mounting hole of said base and into said mounting hole of the receptacle, to secure the device-mounting assembly on said top surface of said base and said base in the cylindrical receiving portion of the receptacle, wherein said base is inserted into said cylindrical receiving portion of the receptacle and rotated around said securing member until said at least one securing pin engages said at least one securing hole, allowing said bottom surface of said base to contact said bottom surface of the receptacle.

8. The apparatus of claim 7, wherein the device-mounting assembly further comprises a bottom surface, and wherein said bottom surface of the device-mounting assembly includes a plurality of teeth extending outward from said bottom surface of the device-mounting assembly, and wherein said apparatus further comprises a serrated portion disposed on said base, said serrated portion mating with said teeth of the device-mounting assembly when the device-mounting assembly is secured to said top surface of said base.

9. The apparatus of claim 8, wherein said securing member comprises a first end having an externally threaded portion and said mounting hole of said receptacle is formed of an internally threaded portion formed in said bottom surface of said receptacle, and wherein said externally threaded portion is screwed into said internally threaded portion to secure said cylindrical base in said cylindrical receiving portion of said receptacle.

10. The apparatus of claim 9, wherein said securing member further comprises a second end having a thumbscrew portion.

11. An apparatus for mounting a device, said apparatus comprising:

a device-mounting assembly, said assembly having a mounting hole;

a securing member;

a support surface having a receptacle, said receptacle having a bottom surface and an inner surface forming a receiving portion, said receptacle further having a mounting hole and at least one securing hole formed in said bottom surface of said receptacle; and a base comprising a top surface, a bottom surface, a mounting hole extending through said top and bottom surfaces of said base, and at least one securing pin extending outward from said bottom surface of said base, wherein said bottom surface of said base is larger than said bottom surface of said receptacle, and wherein said bottom surface of said base rests on said support surface above said bottom surface of said receptacle, said at least one securing pin is engaged in said at least one securing hole, and said securing member is inserted through said mounting hole of said assembly through said mounting hole of said base and into said mounting hole of said receptacle to secure said base to said support surface.

12. The apparatus of claim 11, wherein said top surface of said base includes a serrated portion and said device-mounting assembly further comprises a bottom surface, and wherein said bottom surface of said device-mounting assembly includes a plurality of teeth extending outward from said bottom surface of said device-mounting assembly, said teeth for mating with said serrated portion when said device-mounting assembly is secured to said top surface of said base.

13. The apparatus of claim 11, wherein said securing member comprises a first end having an externally threaded portion and said mounting hole of said receptacle is formed of an internally threaded portion formed in said bottom surface of said receptacle and wherein said externally threaded portion is screwed into said internally threaded portion to secure said base in said receiving portion of said receptacle.

14. The apparatus of claim 13, wherein said securing member further comprises a second end having a thumbscrew portion.

* * * * *